(12) United States Patent
Kieffer, Jr.

(10) Patent No.: US 9,505,093 B2
(45) Date of Patent: Nov. 29, 2016

(54) ROUTER GUIDE

(71) Applicant: Albert Bud Kieffer, Jr., Mt. Carmel, IL (US)

(72) Inventor: Albert Bud Kieffer, Jr., Mt. Carmel, IL (US)

( * ) Notice: Subject to any disclaimer, the term of this patent is extended or adjusted under 35 U.S.C. 154(b) by 709 days.

(21) Appl. No.: 13/954,394

(22) Filed: Jul. 30, 2013

(65) Prior Publication Data

US 2015/0034210 A1 Feb. 5, 2015

Related U.S. Application Data

(60) Provisional application No. 61/681,705, filed on Aug. 10, 2012.

(51) Int. Cl.
*B27C 5/10* (2006.01)
*B23Q 1/62* (2006.01)

(52) U.S. Cl.
CPC .. *B23Q 1/62* (2013.01); *B27C 5/10* (2013.01)

(58) Field of Classification Search
CPC ...... B23Q 1/62; B23Q 9/0092; B23Q 1/525; B27C 5/10
USPC ...................................................... 144/135.4
See application file for complete search history.

(56) References Cited

U.S. PATENT DOCUMENTS

| 3,770,031 | A | * | 11/1973 | Olson | B23Q 1/03 144/135.3 |
|---|---|---|---|---|---|
| 4,215,731 | A | * | 8/1980 | Maynard | B23Q 9/0078 144/136.95 |
| 4,281,694 | A | * | 8/1981 | Gorman | B23Q 9/00 144/136.95 |
| 4,290,464 | A | * | 9/1981 | Marsan | B23Q 9/0028 144/136.95 |
| 4,299,263 | A | * | 11/1981 | Skinner | B23Q 1/48 144/144.1 |
| 4,353,271 | A | * | 10/1982 | Pieczulewski | B23Q 16/102 74/813 L |
| 4,434,824 | A | * | 3/1984 | Bussey | B23Q 9/0078 144/136.95 |
| 4,589,174 | A | * | 5/1986 | Allen | B23Q 1/48 29/33 R |
| 4,772,000 | A | * | 9/1988 | Aubert | B25B 1/2473 269/137 |
| 4,890,657 | A | * | 1/1990 | Shelhorse | B23D 45/024 144/134.1 |
| 5,080,152 | A | * | 1/1992 | Collins | B23D 45/021 144/136.95 |
| 5,273,090 | A | * | 12/1993 | Klemma | B23Q 9/0085 144/134.1 |

(Continued)

FOREIGN PATENT DOCUMENTS

DE 29603791 U1 * 7/1996 ........... B23Q 35/102

OTHER PUBLICATIONS

Huyen-Tran Ton-nu, NPL and Fulltext Search Results Apr. 14, 2016, Scientific Technical Information Center.*

*Primary Examiner* — Matthew G Katcoff
(74) *Attorney, Agent, or Firm* — Gary K. Price

(57) ABSTRACT

A router guide having a work surface frame that defines upper and lower work surfaces. The guide further includes a tilting mechanism for tilting the router motor to a desired orientation with respect to a work piece, and a circular disc that is rotatably supported to the work surface to facilitate rotation of the circular disc. The router guider further includes multiple adjustments, including, a first adjustment for frictionally rotating the work surface with respect to the router bit; a second adjustment for slidably positioning the work surface along a first and second range of motion; and, a third adjustment for positioning the work surface along a third range of motion.

11 Claims, 3 Drawing Sheets

(56) References Cited

U.S. PATENT DOCUMENTS

| | | | | |
|---|---|---|---|---|
| D351,774 S | * | 10/1994 | Witt | D8/71 |
| 5,562,136 A | * | 10/1996 | Blackshear | B23Q 9/0071 |
| | | | | 144/134.1 |
| 5,664,612 A | * | 9/1997 | Klemma | B23D 45/021 |
| | | | | 144/134.1 |
| 5,667,000 A | * | 9/1997 | Bean | B23Q 9/0014 |
| | | | | 144/136.7 |
| 5,682,934 A | * | 11/1997 | Rybski | B23Q 9/0085 |
| | | | | 144/136.95 |
| 5,772,368 A | * | 6/1998 | Posh | B23Q 9/0085 |
| | | | | 144/136.95 |
| 7,000,658 B1 | * | 2/2006 | Soukiassian | B23D 45/027 |
| | | | | 144/114.1 |
| 2003/0178099 A1 | * | 9/2003 | Sanfilippo | B23D 47/025 |
| | | | | 144/286.5 |
| 2005/0081954 A1 | * | 4/2005 | Wielechowski | B27C 5/10 |
| | | | | 144/136.95 |

\* cited by examiner

ROUTER GUIDE

CROSS REFERENCES TO RELATED APPLICATIONS

U.S. Provisional Application for Patent No. 61/681,705, filed Aug. 2, 2012 which is hereby incorporated by reference. Applicant claim priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not Applicable

BACKGROUND OF THE INVENTION

1. Field of the Invention

This invention relates generally to woodworking and more particularly to a router table for use in cutting various types of joints, shapes, and articles from wooden work pieces, as well as other precision woodworking operations. More particularly, the present invention includes an improved router guide for positioning and guiding the cutting tool of the router or the work piece.

2. Brief Description of Prior Art

Router tables are widely used because of their ability to make more precise cuts than can be made by hand. A router table is typically a horizontal work surface under which a conventional router may be mounted in order to use it as a shaper by moving a work piece relative to the router bit, rather than moving the router bit relative to the work piece. Often, such router tables are inconvenient to use because adjustment of router bit position must be accomplished by adjusting the router on its base, which is difficult to do with the router mounted upside down underneath a router table.

To maintain the work piece in position relative to the cutter bit, some prior art router tables are provided with elongated fences that are connected to the top of the main table so that they can be moved laterally toward and away from the cutter bit. In this type of arrangement, it may be cumbersome and potentially dangerous for a user to attempt certain horizontal cuts while manually holding the work piece against the fence in a position perpendicular to the main table. Further, by introducing this step of moving or repositioning the fence or the material (work piece) being cut, the effort and time needed to complete a project is increased and, the potential for inaccuracy is greatly increased by the new positioning of the pieces.

There is thus a need for a router guide which effectively guides the user in safe and convenient positioning and securing of the work piece while allowing simple, accurate, and multiple adjustments of the router bit with respect to the work piece, as well as other precision woodworking operations.

As will be seen from the subsequent description, the preferred embodiments of the present invention overcome disadvantages of the prior art.

SUMMARY OF THE INVENTION

In accordance with the present invention, a support base for a router is disclosed. The present invention overcomes the above-referenced shortcomings of prior art router table assemblies by providing a router guide design which includes rotatable and adusting subassemblies to allow multi-positioning of the router axis with respect to the work surface when cutting on and off-center. In this manner, positioning and precision cutting of an elongate work piece is accomplished accurately and efficiently, and adjustment of the router bit is performed conveniently.

A router guide in accordance with the present invention includes a frame having upper and lower level work surfaces, and a tilting mechanism for tilting the router motor to a desired orientation with respect to the work piece. The router guider further includes multiple adjusting means, including, rotation means for frictionally rotating the work surface with respect to the router bit; adjusting means for slidably positioning the work surface along a first and second range of motion; and, adjusting means for positioning the work surface along a third.

BRIEF DESCRIPTION OF THE DRAWINGS

FIG. 1 also shows a partial cutaway view of one of the guide members of the present invention.

FIG. 3 also shows a partial cutaway view of the circular disc of the present invention.

DESCRIPTION OF THE PREFERRED EMBODIMENT

Figure 1:
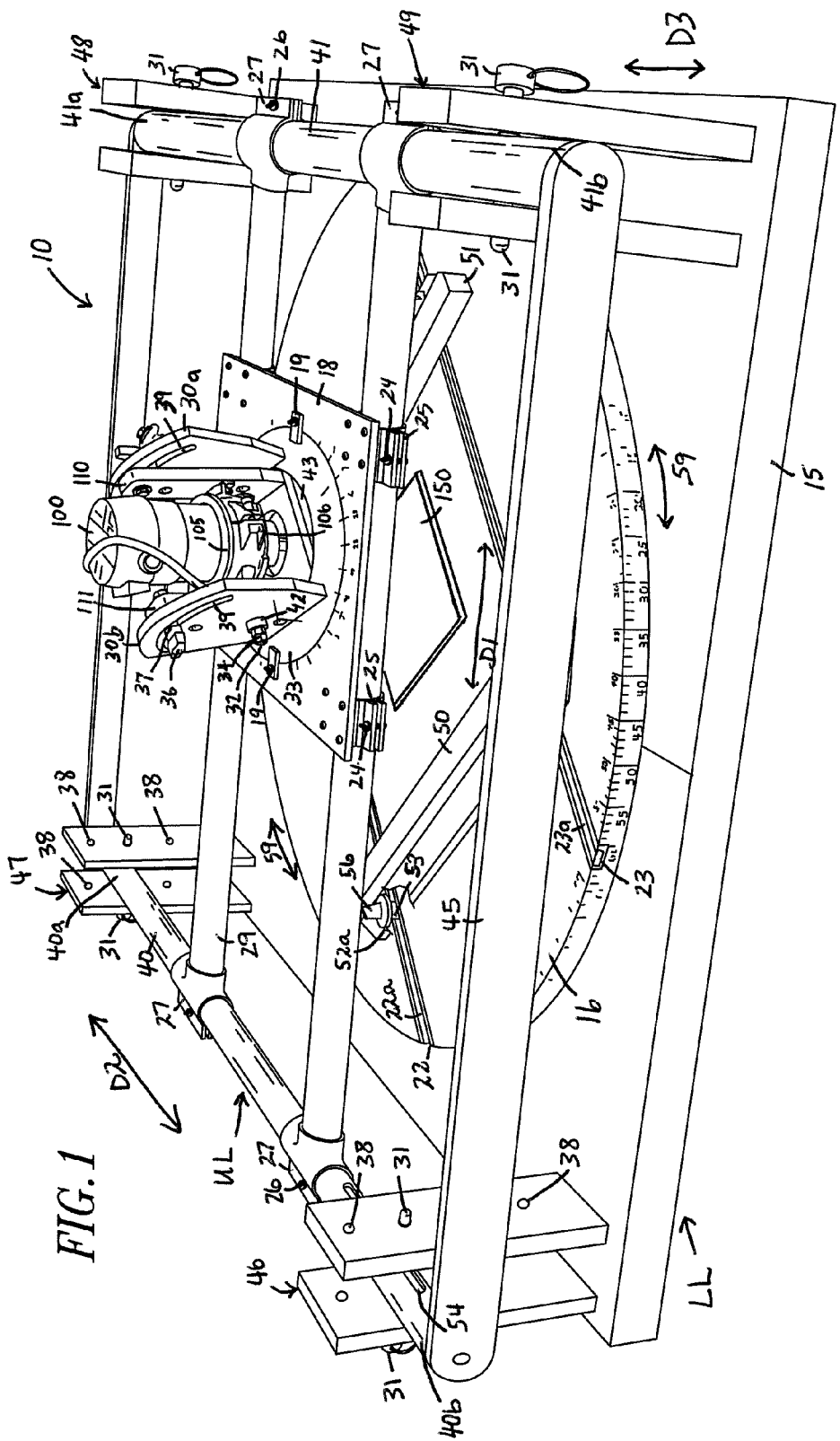
FIG. 1 is a perspective view of a preferred embodiment of the present invention, a router guide for a router.

The router guide for a router of the present invention is directed to a router assembly configuration that allows multiple positioning of the router axis with respect to the work piece. Specifically, it will be noted in the drawings that the assembly of the present invention provides a means for multiple positioning and precision cutting of an elongate work piece with respect to the router axis. In the broadest context, the assembly of the present invention consists of components configured and correlated with respect to each other so as to attain the desired objective.

FIG. 1 illustrates a preferred embodiment of a router guide for a router made in accordance with the present invention. The router guide of the present invention, designated as numeral 10, is generally shown in the perspective view of FIG. 1. The router guide 10 includes a frame 15 having a work surface 16. A motor 100 in housing 105 is in communication with the frame 15 as will be described. The frame 15 further includes adjusting means, as will be described, for generally adjusting the position of the motor 100 with respect to work piece 150. The adjusting means can be used in positioning the work surface 16 in addition to being used while the motor 100 is engaged in work piece 150.

Although the housing 105 may be configured to accept a particular motor 100, in the preferred embodiment, the housing 105 includes various features which enables it to accommodate motors supplied by different manufacturers utilizing different styles and sizes. In particular, housing 105 includes a bracket member 107 (see FIG. 3) that preferably wraps around an end portion of the motor 100, and locking means 106 is provided to lockingly engage the full-sized motor and housing 105. Means 106 is preferably a bolt 108 that is threadably engaged in threaded portion 109 of the bracket 107.

Figure 3:
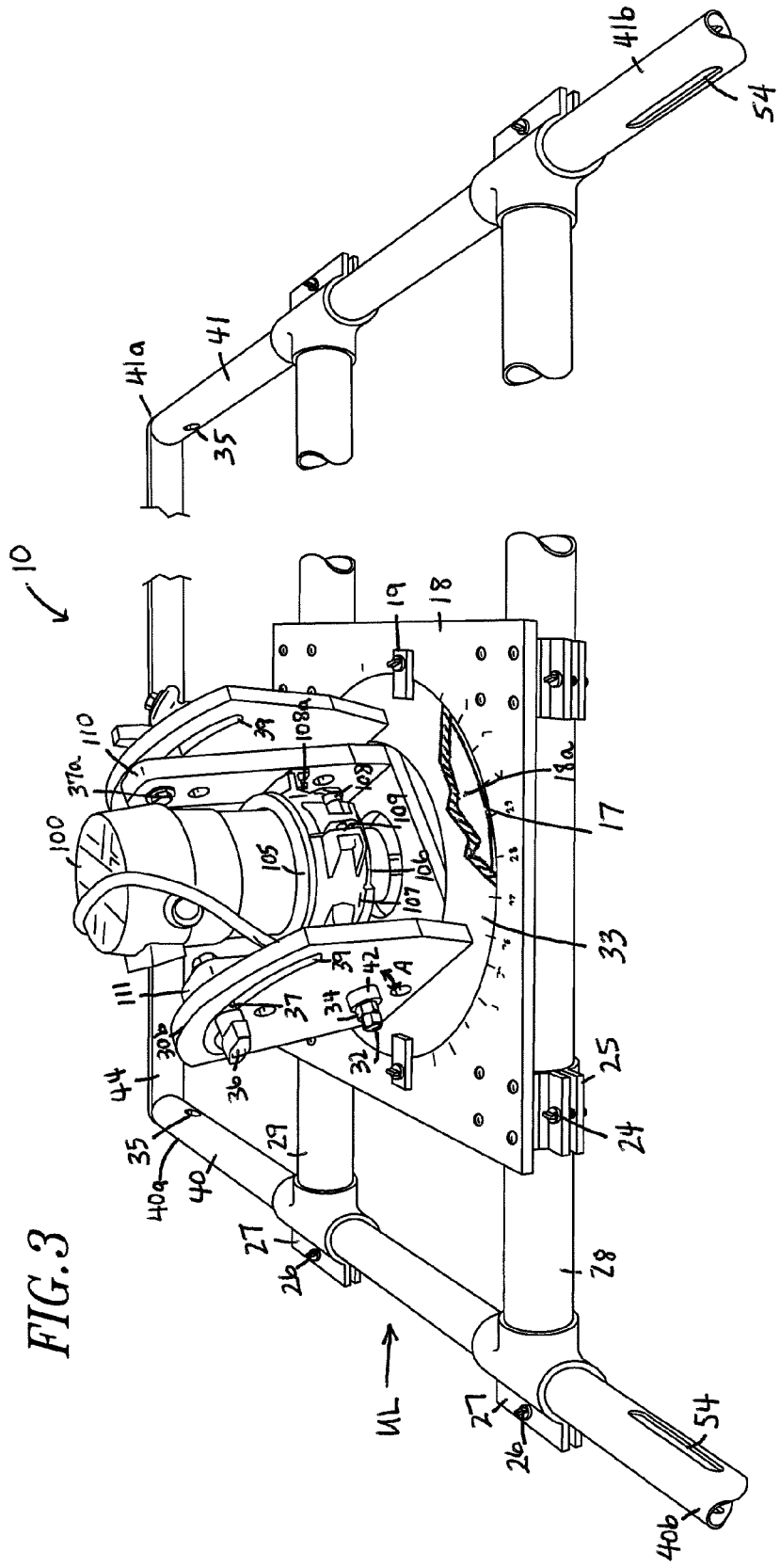
FIG. 3 is a perspective sectional view of the router guide illustrated in FIG. 1, best illustrating the upper level of the router guide.

On either side of the motor 100 there is a pair of opposing pivot plates 30a and 30b perpendicular to a circular disc 33. These pivot plates 30a, 30b are pivotably secured to a pair of vertical members 110, 111 through the use of fasteners, using, for example, bolt and nut, 32, 34 respectively. Bolt 32 is preferably disposed within a sleeve 42, such that bolt 32 can rotate about an axis A. Such fasteners, for example, bolt and nut 32, 34, respectively, further connect the vertical members 110, 111 to bracket member 107 at connection point 108a (FIG. 3).

A wing nut 36 or other suitable hand-operated fastener is further included on both sides of the assembly to lockingly engage the motor 100 at a desired orientation. In particular, loosening of the wing nut 36 enables outward threaded rod 37 to rotate within slot 39. As best illustrated in FIG. 3, each threaded rod 37, is also attached 37a to vertical member 110, 111. As discussed, the vertical members 110, 111 are further connected 108a to bracket member 107, such that loosening the wing nuts 36 enables outward threaded rod 37 to travel along the length of slot 39 until motor 100 is at the desired orientation. As should be understood, adjusting the location of threaded rod 37 along slot 39 as described, causes bolt 32 to rotate along axis A.

The circular disc 33 is supported by a frame member 18 to further facilitate placement of the disc 33 and motor 100 with respect to the work piece 150. More particularly, frame member 18 defines a circular void 18a sized for receiving the circular disc 33. The circular disc 33 rests on a ledge 17 of the frame member 18 and frictionally rotates within the frame member 18. As should be understood, rotating circular disc 33 will likewise facilitate rotation of the pivot plates and motor. Locks 19 will lockingly engage the circular disc 33 in place with the frame member 18 at the desired orientation. Loosening of the locks 19 enables the circular disc 33 to rotate as described.

The circular disc 33 further defines a central aperture 43 to ensure that the router's bit (not shown) attached to the motor 100 does not make contact with the circular disc 33 during use.

The tilting action provided by the present invention as described facilitates a number of versatile uses beyond angled cutting. For example, with the work surface 16 and circular disc 33 held in a steady orientation, and with the wing nuts 36 slightly loosened to an extent which allows the motor 100 to tilt freely relative to the work surface 16, and by further using an appropriate bit and a predetermined cut depth, the invention may be advantageously used for many different applications. Regardless of the application, one object of the present invention is to replace the existing standard base supplied with the router motor housing such that the standard base may never need to be used again, that is, in the preferred embodiment, the present invention provides all functions possible with the standard base but with many others described above and subsequently.

The frame 15 can generally be described as having an upper level (designated in the drawings as UL) and a lower level (designated as LL) with the frame member 18 being disposed on the upper level UL and the work surface 16 on the lower level LL.

The upper level UL is formed of four (4) arms, designated numerals 40, 41, 44, 45 that define a generally rectangular configuration. As illustrated, the upper level UL is supported by four (4) vertical leg members, designated numerals 46, 47, 48, 49. Each of the four (4) vertical leg members include at least one and preferably at least two (2) apertures 38 (for illustration purposes only, the drawings illustrate each leg member having four (4) apertures 38 selectively adjusting the height, i.e., the distance between the upper and lower levels, of the upper level UL. As further illustrated, arms 40, 41 include an aperture 35 disposed at one end 40a, 41a, and a slot member 54 disposed at opposite ends 40b, 41b of arms 40, 41. In application, pin 31 is received within each of the apertures 35, 54 and the selected apertures 38 of each leg member 46 to position the height of the upper level UL with respect to the lower level LL.

Each slot member 54 preferably having an elongated oval-shaped configuration for receiving pin 31. Connecting the apertures 35, 54 with the selected apertures 38 of the leg member 46 as described, can be such that the upper level UL is substantially level as show in the drawings, or, the selected apertures 38 at ends 40a, 41a can be set at a different height than the selected apertures 38 at ends 40b, 41b such that end 40a, 41a is higher or lower than end 40b, 41b with respect to the work piece 150.

As should now be understood, the oval-configuration of slot member 54 allows for additional movement of pin 31 when selecting a level at ends 40a, 41a that is different (higher or lower) than the selected level of ends 40b, 41b attached to slot members 54.

As shown in FIGS. 1 and 3, the upper level UL further includes a pair of supports 28, 29 that, as will be described, connect with arms 40 and 41, and run parallel with arms 44, 45. Clamps 27 generally connect the supports 28, 29 with the arms 40, 41. Each clamp 27 includes means 26 for loosening or releasing the clamp to allow the clamp to slide along the length of the arms 40, 41. As will be understood, being able to slide the supports 28, 29 along the length of the arms 40, 41 allows the user to further adjust the positioning of the motor 100 with respect to the work piece 150.

As illustrated, the frame member 18 rests on the supports 28, 29. Connection members 25 are connected to the frame member 18 and supports 28, 29. Connection members 25 include means 24 for loosening or releasing the connection member 25 from the supports 28, 29 to allow the connection means 25 to slide along the length of the supports 28, 29. It should be understood, positioning the connecting means 25 along the length of the supports 28, 29 allows the user to further adjust the positioning of the frame member 18 and the motor 100 with respect to the work piece 150.

As described, loosening the connection members 25 allows positioning the frame member 18 and the motor 100 in a first direction D1 (see FIG. 1), and loosening clamps 27 allows positioning the frame member 18 and the motor 100 in a second direction D2, and, adjusting the UL to the selected apertures 38 allows for positioning the frame member 18 and the motor 100 in a third direction D3.

As illustrated, the work surface 16 further includes a pair of opposing guides 22, 23 for application of guide members 50, 51. The opposing guides 22, 23 each define a track 22a, 23a, for, as will be described, sliding receipt of a threaded rod 53. In particular, each guide member 50, 51 includes a pair of apertures 52a, 52b for receipt of the threaded rod 53 and wing nut 56, or other suitable hand-operated fastener to lockingly engage the guide members 50, 51 at a desired location. As illustrated, the threaded rod 53 and wing nut 56 is in communication with the tracks 22a, 23a of the work surface 16, which opposing tracks 22a, 23a preferably extend the approximate length of the work surface 16. Loosening of the wing nut 56 enables threaded rod 53 to slide along the track 22a, 23a in order to size the guide members 50, 51 with respect to the work piece 15, and, position the guide members 50, 51 at a desired location. As such, the guide members 50, 51 further positions the work piece 150 with respect to the motor 100.

The work surface 16 and circular disc 33 is a generally planar surface. The work surface 16 collectively with the guide members 50, 51 would support a work piece 150, the work piece being moveable along a longitudinal axis parallel to the work surface 16.

Figure 2:
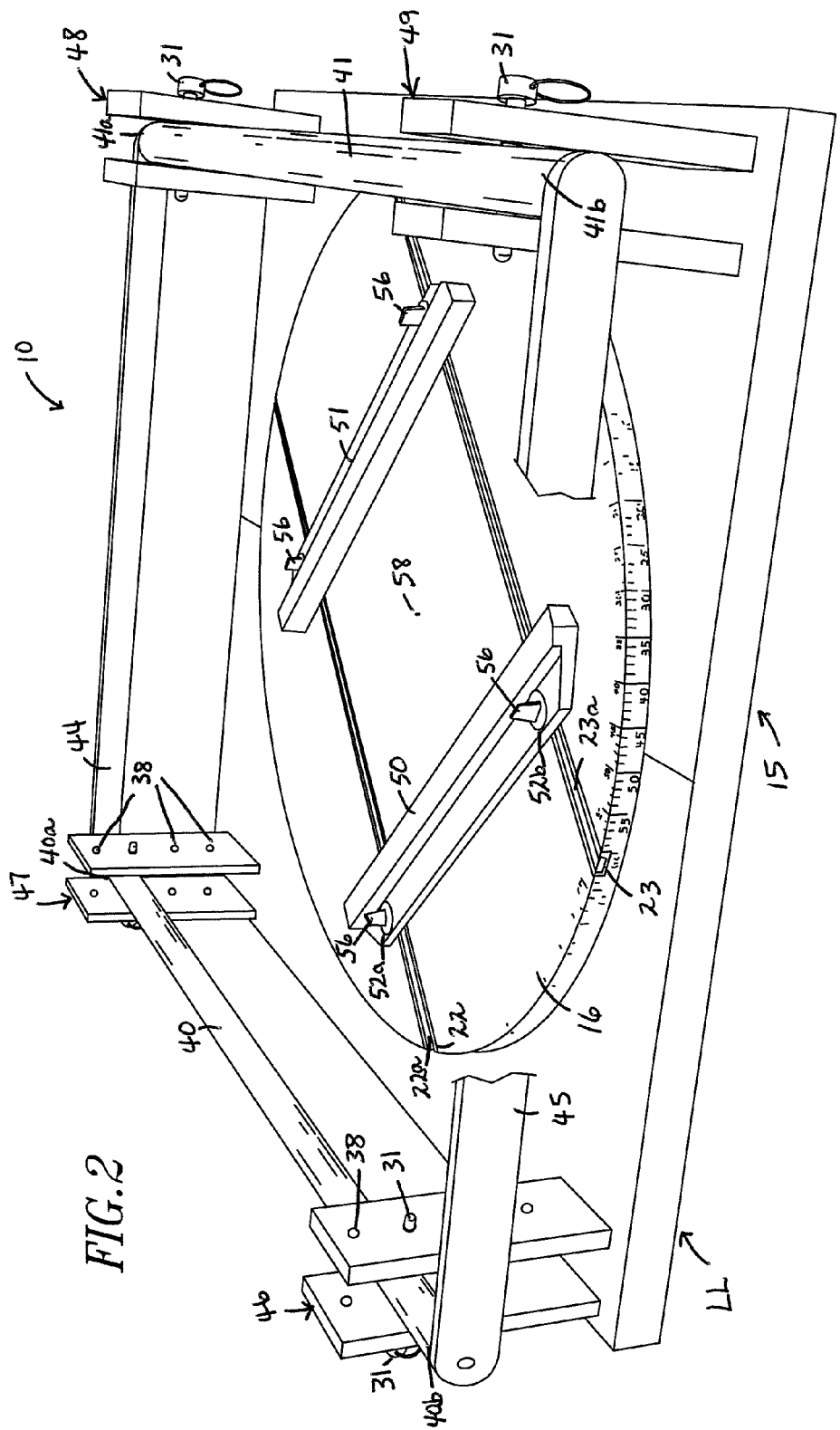
FIG. 2 is a front sectional view of the router guide illustrated in FIG. 1, best illustrating the lower level of the router guide.

Referring to FIG. 2, the router guide 10 shows details discussed with a portion of the upper level UL of the frame 15 removed in order to illustrate the actual flat work surface 16 with the work piece 150. The guide members 50, 51, move slidingly along the opposing guides 22, 23 in order to engage the work piece 150.

The frame 15 further includes a pin 58 (FIG. 2) appropriately connected to the work surface 16 and centrally positioned on the lower level LL. The work surface 16 can rotate 59 (shown in FIG. 1) with respect to the router's bit attached to the motor 100, while the guides 50, 51 hold the work piece 150, thus assuring overall control of bit depth, tilt angle and lateral movement.

As illustrated, the router guide 10 enables convenient and accurate cutting of the work piece in a variety of orientations.

While the best mode for carrying out the invention has been described, those familiar with the art to which this invention relates will recognize various alternative designs and embodiments for practicing the invention. Thus, the above-described preferred embodiment is intended to be illustrative of the invention which may be modified within the scope of the appended claims.

I claim:

1. A router guide comprising:
   a frame having an upper level and a lower level that includes a lower work surface,
   said upper level including first and second opposing arms, and a pair of supports perpendicular to said first and second opposing arms that are in communication with a frame member, said frame member having a circular void sized for receiving a circular disc, and wherein said circular disc rests on a ledge that inwardly extends around the periphery of said circular void, said circular disc including a bracket that is lockingly engaged with an end of said router motor,
   first and second opposing vertical members having lower ends connected to said bracket and wherein an upper end of said first vertical member is pivotally secured to a first pivot plate and an upper end of said second vertical member is pivotally secured to a second pivot plate,
   an open space disposed between said upper ends of each of said first and second vertical members and said router motor, each of said upper ends of said first and second pivot plates include a slot and an adjustor configured to selectively travel along the length of said slot, wherein each said adjustor passes through the slot and is attached to the vertical member for rotatably positioning said router motor to a desired orientation with respect to said work piece,
   and wherein said upper level is supported by four (4) vertical leg members that upwardly extend from said lower level and are in communication with said first and second opposing arms,
   a first adjustor for selectively positioning said frame member in a first range of motion,
   a second adjustor for selectively positioning said frame member in a second range of motion, and
   a third adjustor for selectively positioning said upper level and said frame member in a third range of motion.

2. The router guide as recited in claim 1, further including a pin member centrally positioned on said lower work surface of said lower level for rotating said lower work surface with respect to the router bit.

3. The router guide as recited in claim 1, wherein said upper level further including third and fourth arms, and wherein said first, second, third and fourth arms generally define a rectangular configuration.

4. The router guide as recited in claim 1, wherein each of said four leg members include at least one aperture for selectively adjusting said upper level in said third range of motion, thereby adjusting the router motor with respect to the work piece.

5. The router guide as recited in claim 4, wherein said frame member is releasably secured to said pair of supports.

6. The router guide as recited in claim 5, wherein said first adjustor is an at least one connection member that connects said frame member to said pair of supports, and wherein said at least one connection member configured to be selectively positioned along the length of said pair of supports for adjusting said frame member in said first range of motion, thereby adjusting the router motor with respect to the work piece.

7. The router guide as recited in claim 5, wherein said second adjustor are clamps that connect said pair of supports to said first and second arms, and wherein said clamps configured to be selectively positioned along the length of said first and second arms for adjusting said frame member in said second range of motion, thereby adjusting the router motor with respect to the work piece.

8. The router guide as recited in claim 2, wherein said lower work surface includes first and second guide members, wherein said first and second guide members releasably hold the work piece on the lower work surface.

9. The router guide as recited in claim 8, wherein said first and second guide members includes fasteners for selectively securing the first and second guide members along the lower work surface.

10. A router guide comprising:
    a frame having an upper level and a lower level,
    said upper level including a frame member, said frame member supporting a circular disc having a tilting mechanism for positioning a router motor to a desired orientation with respect to a work piece, said tilting mechanism including a bracket that is lockingly engaged with an end of said router motor, first and second opposing vertical members having lower ends that connect to said bracket and wherein an upper end of said first vertical member is pivotally secured to an upper end of a first pivot plate and an upper end of said second vertical member is pivotally secured to an upper end of a second pivot plate, an open space is disposed between said upper ends of each said first and second vertical members and said router motor, each of said upper ends of said first and second pivot plates include a slot and an adjustor configured to selectively travel along the length of said slot, wherein each said adjustor passes through the slot and is attached to the vertical member for rotatably positioning said router motor,
    wherein said circular disc rests on a ledge of said frame member such that said circular disc rotates on said ledge,
    wherein said upper level further includes a pair of supports, and
    wherein said frame member is secured to said pair of supports with connection members, said connection members configured to selectively position said frame member along the length of said pair of supports for positioning said frame member in a first range of motion, wherein clamps connect said pair of supports to first and second opposing arms of said upper level, and wherein said clamps configured to selectively position said frame member along the length of said first and second opposing arms for positioning said frame member in a second range of motion, wherein said upper level is supported by four vertical leg members that upwardly extend from said lower level, each of said four leg members include at least one aperture for selectively adjusting said upper level in a third range of motion, a pin member centrally positioned on a defined lower work surface of said lower level such that said lower work surface can rotate with respect to the router bit, and wherein said lower work surface includes first and second guide members for releasably holding the work piece on the lower work surface, and wherein said first guide member includes a first fastener for selectively securing said first guide members along the length of a first track of said lower work surface, and said second guide member includes a second fastener for selectively securing said second guide member along the length of a second track of said lower work surface.

11. A router guide comprising:

a frame having first, second, third and fourth arms that generally define a rectangular configuration, a pair of supports perpendicular to said first and second arms that support a frame member, said frame member having a circular void sized for receiving a circular disc, and wherein said circular disc rests on a ledge that inwardly extends around the periphery of said circular void such that said circular disc rotates on said ledge, and said circular disc having a tilting mechanism for positioning a router motor to a desired orientation with respect to a work piece, said frame member including at least one locking member configured to releasably engage the circular disc with said frame member, wherein said frame member is secured to said pair of supports with connection members, said connection members configured to selectively position said frame member along the length of said pair of supports for positioning said frame member in a first range of motion, wherein clamps connect said pair of supports to said first and second arms, and wherein said clamps configured to selectively position said frame member along the length of said first and second arms for positioning said frame member in a second range of motion, and wherein said tilting mechanism includes a bracket that is lockingly engaged with an end of said router motor, first and second opposing vertical members have lower ends that are connected to said bracket and wherein an upper end of said first vertical member is pivotally secured to a first pivot plate and an upper end of said second vertical member is pivotally secured to a second pivot, and an open space is disposed between said upper ends of each said first and second vertical members and said router motor, each of said upper ends of said first and second pivot plates include a slot and an adjustor configured to selectively travel along the length of said slot, wherein each said adjustor passes through the slot and is attached to the vertical member for rotatably positioning said router motor.

* * * * *